United States Patent [19]

Nagabusa

[11] Patent Number: 5,036,397
[45] Date of Patent: Jul. 30, 1991

[54] METHOD OF DRIVING A CCD SENSOR BY CHANGING THE TRANSFER PULSE PERIOD RELATIVE TO THE SHIFT PULSE PERIOD

[75] Inventor: Yoshihuki Nagabusa, Tokyo, Japan

[73] Assignee: Asahi Kogaku Kogyo K.K., Tokyo, Japan

[21] Appl. No.: 363,012

[22] Filed: Jun. 8, 1989

[30] Foreign Application Priority Data

Jun. 10, 1988 [JP] Japan .................................. 63-143329

[51] Int. Cl.$^5$ .............................................. H04N 3/24
[52] U.S. Cl. ................................ 358/213.26; 358/483
[58] Field of Search .................... 358/213.11, 482, 483, 358/213.22, 213.26, 213.29; 250/578.1

[56] References Cited

U.S. PATENT DOCUMENTS

| | | | |
|---|---|---|---|
| 4,703,365 | 10/1987 | Mumford | 358/483 |
| 4,712,134 | 12/1987 | Murakami | 358/483 |
| 4,774,592 | 9/1988 | Suzuki et al. | 358/483 |

Primary Examiner—Stephen Brinich
Attorney, Agent, or Firm—Sughrue, Mion, Zinn Macpeak & Seas

[57] ABSTRACT

A CCD sensor has a photosensitive section, a transfer section, and an output section. The photosensitive section is split up into three regions (front, middle, and rear). When it is necessary to output the middle region and it is not necessary to output the front and rear regions, a method may be implemented so that the rear region is not output through the output section. The data from the photosensitive section is transferred to the transfer section in parallel and in synchronization with a shift pulse. The period of a transfer pulse is changed with respect to the shift pulse so that only the data corresponding to the front and middle regions is serially output from the transfer section. New data is then transferred from the photosensitive section to the transfer section in a manner such that the data corresponding to the new front region overlaps with the data corresponding to the first rear region.

13 Claims, 1 Drawing Sheet

METHOD OF DRIVING A CCD SENSOR BY CHANGING THE TRANSFER PULSE PERIOD RELATIVE TO THE SHIFT PULSE PERIOD

BACKGROUND OF THE INVENTION

The present invention relates to a method of driving a CCD sensor, and more particularly to the changing of a transfer pulse period with respect to a shift pulse period.

A CCD sensor, having a photosensitive section composed of a plurality of photosensitive picture elements, has been recently applied, as a light detecting element for converting optical images into electrical signals, to an image reading device such as an image scanner. In this case, generally all the picture element signals output by the picture elements in the photosensitive section are processed as image data. However, sometimes the picture element region at the middle of the photosensitive picture element array is a necessary picture element region having image data which must be output and the other two picture element regions on both sides of the necessary picture element region are accordingly unnecessary picture element regions having image data which need not be output. In this case, covers for blocking optical paths (namely, optically shielding boards) are provided over the two end portions of the photosensitive section in the CCD sensor, so that the picture element signals output by the two end portions are processed into predetermined signals. This keeps the unnecessary image data from being output.

The optical shielding board, having a shielding range determined with mechanical dimensional accuracy, should guard the necessary picture element region with an optical path nonblocking margin provided on the side of the unnecessary picture element region at its edge which is the border line between the necessary picture element region and the unnecessary picture element region. That is, because of the guard region, the entirety of the unwanted image data cannot be accurately kept from being output using the above-described optical shielding board.

Furthermore, although the effective image data is reduced, the unnecessary picture element regions output picture element signals having a predetermined level, and the total number of picture element signals is maintained as it is. Therefore, the signal processing time is not reduced thus impeding the high speed operation of the CCD sensor.

SUMMARY OF THE INVENTION

In view of the foregoing, an object of the present invention is to provide a method of driving a CCD sensor in which the picture element signals output by the photosensitive picture elements in the end regions of the photosensitive section of the CCD sensor are rejected so that they are not output by the CCD sensor.

The foregoing object of the present invention has been achieved by the provision of a method of driving a CCD sensor in which picture element signals provided by a photosensitive section having a plurality of photosensitive picture elements are transferred, in a parallel mode, from the photosensitive section to a transfer section in synchronization With a shift pulse. The picture element signals thus transferred are read out, in a series mode, in synchronization with a transfer pulse. According to the present invention, the photosensitive section comprises front, middle and rear regions each having a picture element array. The picture element array in the rear region is smaller than the picture element array in the front region. The period of the transfer pulse is changed with respect to the period of the shift pulse, so that, when the picture element signals of the front and middle regions have been read out of the transfer section but the picture element signals of the rear region remain in the transfer section another group of picture element signals are transferred, in a parallel mode, from the photosensitive section to the transfer section. Thus, the picture element signals output by the rear region of the photosensitive section in the CCD sensor are accurately rejected in synchronization with the shift pulse and are not output from the transfer section.

BRIEF DESCRIPTION OF THE DRAWINGS

Other features and advantages of the present invention will be apparent from the following description taken in connection with the accompanying drawings wherein:

FIG. 2, are explanatory diagrams describing one example of the CCD sensor driving method according to the present invention.

DETAILED DESCRIPTION OF THE PREFERRED EMBODIMENT

One embodiment of the present invention will be described with reference to the accompanying drawings.

Figure 1:
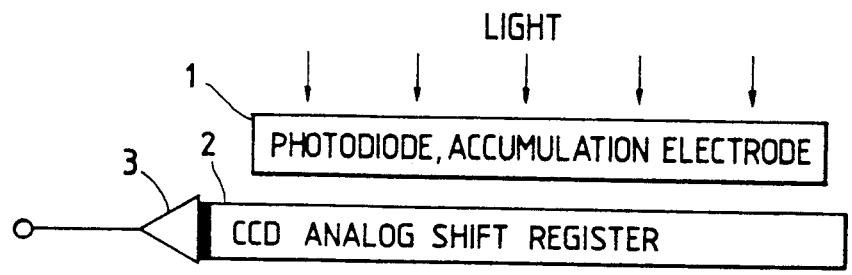
FIG. 1 is an explanatory diagram showing the entire arrangement of a CCD sensor to which a CCD sensor driving method according to the present invention is applied.

FIG. 1 is an explanatory diagram outlining the entire arrangement of a CCD sensor to which one example of a CCD sensor driving method according to the present invention is applied.

The CCD sensor includes a photosensitive section 1 including photosensitive picture element arrays in which pairs of photo diodes and storage electrodes are provided, a transfer section 2 composed of CCD analog shift registers corresponding to the photosensitive picture element arrays in the photosensitive section 1, and an output section 3 including a floating capacitor and a source follower circuit.

An image (i.e., optical image data) is subjected to photoelectric conversion by the photosensitive section 1 so that it is stored as optical signal charges (or picture element signals) in the photosensitive section 1. The picture element signals are transferred, in a parallel mode, from the photosensitive section 1 to the transfer section 2 in synchronization with a shift pulse SH. The picture element signals thus transferred are further transferred, in a series mode, from the transfer section 2 to the output section 3 in synchronization with a transfer pulse $\phi$. Output section 3 converts the picture element signals (i.e.. the signal charges) into voltages, which are output by the CCD sensor. Depending on the structure of &he transfer section 2, the transfer pulse $\phi$ is a two-phase pulse or a three-phase pulse. In both cases, the technical concept of the present invention is applicable. Therefore instead of a two-phase pulse or a three-phase pulse, a transfer pulse will be used for describing the invention.

FIGS. 2(a), 2(b), 2(c), and 2(d) are explanatory diagrams for a description of one example of a method of driving the CCD sensor shown in FIG. 1.

Figure 2A:
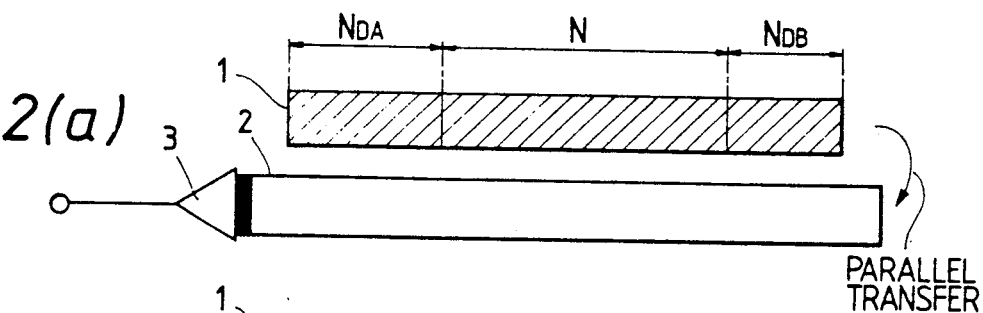
FIGS. 2(a), 2(b), 2(c), and 2(d), which together comprise

As shown in FIG. 2(a), the middle portion of photosensitive section 1 is a region including effective image data, namely, a necessary picture element region. The number of picture elements in the region is N (hereinafter referred to as "a necessary picture element number N", when applicable). The photosensitive section 1 has unnecessary picture element regions on both sides of the necessary picture element region. The number of picture elements in these unnecessary picture element regions is and $ND_{DA}$ and $N_{DB}$, respectively (hereinafter referred to as "unnecessary picture element numbers $N_{DA}$ and $N_{DB}$". when applicable.) The relation between the unnecessary picture element numbers $N_{DA}$ and $N_{DB}$ is as follows:

$$N_{DA} > N_{DB}$$

The period $T_{SH}$ of the shift pulse SH is the charge storage time $T_{INT}$ of the photosensitive section 1 during which an appropriate amount of optical signal charges can be accumulated. However, for the purpose of operating the CCD sensor at high speed, it is set to the minimum value with which the photosensitive section 1 can obtain a predetermined quantity of input light from the optical intensity of an image under detection and which meets the relation to the transfer pulse $\phi$ which is described later.

The clock frequency $f\phi$ of the transfer pulse $\phi$ is set to a value with which the unnecessary picture element number $N_{DA}$ and the necessary picture element number N can be transferred from the transfer section 2 to the output section 3 during one period of the shift pulse SH.

The clock frequency $f\phi$ and the charge storage time $t_{INT}$ are determined to meet the following relation:

$$((N_{DA}+N)/f\phi) \times \mu \leq t_{INT} \qquad (1)$$

where $\mu$ is a coefficient determined according to the structure of the transfer section 2.

Figure 2B:
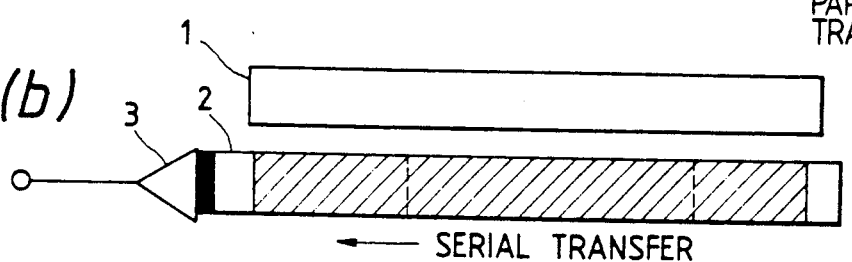
Figure 2C:
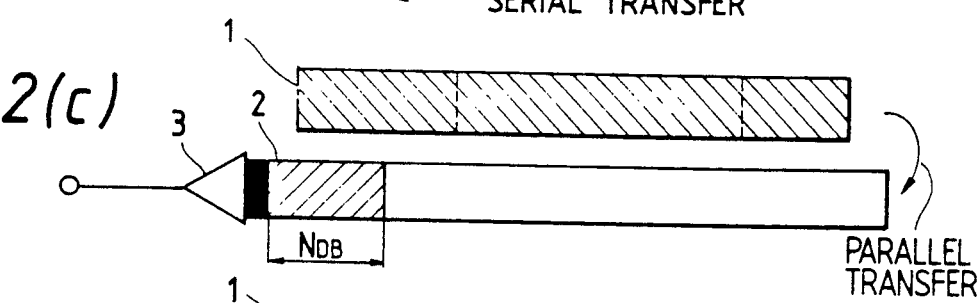

Light from an image or the like (or an optical image) is applied to the photosensitive section 1 and optical signal charges (picture element signals) are produced as indicated by the oblique lines in FIG. 2(a). They are transferred, in a parallel mode to the transfer section in synchronization with the shift pulse SH as shown in FIG. 2(b). The picture element signals are transferred, in a series mode, from the transfer section to the output section 3 in synchronization with the transfer pulse $\phi$. Since the clock frequency $f\phi$ of the transfer pulse $\phi$ is determined as described above, when, as shown in FIG. 2(c), the unnecessary picture element $N_{DA}$ and the necessary picture element number N have been transferred and the unnecessary picture element $N_{DB}$ still remains in the transfer section 2, the next shift pulse SH occurs.

Figure 2D:
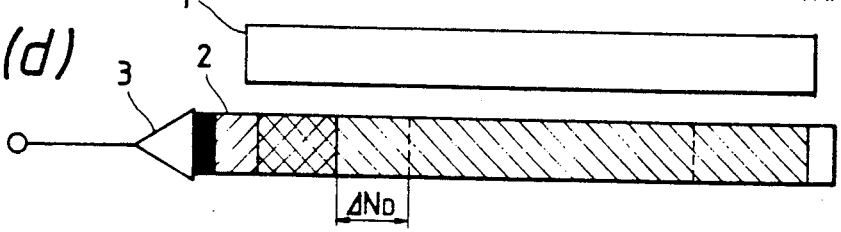

Therefore, as shown in FIG. 2(d), the first group of picture element signals and the second group of picture element signals are partially overlapped. The overlapped portions of the picture element signals cannot be used any longer and need not be output because they are those of the unnecessary picture element regions. Even when the optical signal charges are caused to overflow from the respective picture elements to the next picture elements because of the overlapping of the picture element signals, the necessary picture element region is not affected at all because of the relationship $N_{DA} > N_{DB}$. That is, the picture element region corresponding to the difference $\Delta N_D$ therebetween serves as a buffer region, thus protecting the necessary picture element region.

In other words, the clock frequency $f\phi$ of the transfer pulse $\phi$ with respect to the period $T_{SH}$ of the shift pulse SH (i.e., the charge storage time $T_{INT}$ of the photosensitive section 1) is determined according to equation (1), and the CCD sensor is driven with that timing. As a result, as is apparent from FIG. 2(d), the unnecessary picture element number $N_{DB}$ of the unnecessary picture region is not transferred to the output section. Therefore, the predetermined picture elements in the rear end portion of the photosensitive section 1 are accurately rejected by a predetermined number ($N_{DB}$) in synchronization with the shift pulse SH, so that the total number of picture element signals output by the CCD sensor is reduced. The picture element signal processing time is reduced as much as the reduction of the total number of picture element signals, thus resulting in high speed operation of the CCD sensor.

In the embodiment described above, the clock frequency $f\phi$ of the transfer pulse $\phi$ with respect to the period $T_{SH}$ (the charge storage time $t_{INT}$) of the shift pulse SH is determined according to Equation (1). However, the present invention is not limited thereto or thereby. For instance, in the case where the output voltage of the CCD sensor may be decreased, the period $T_S$ (charge storage time $t_{INT}$) of the shift pulse SH set to the minimum value may be further decreased to a value with which the photosensitive section 1 cannot obtain a predetermined quantity of input light from the optical intensity of an optical image under detection. In this case, the clock frequency $f\phi$ of the transfer pulse $\phi$ is increased in correspondence to the decrease of the period $T_{SH}$. As a result, the transfer time, for transferring and outputting the unnecessary picture element number $N_{DA}$ and the necessary picture element number N can be reduced.

As described above, in the method of the present invention, the transfer pulse period is changed with respect to the shift pulse period. When a predetermined number of picture element signals have been read out of the transfer section, another group of picture element signals are transferred, in a parallel mode from the photosensitive section to the transfer section. Therefore, the picture element signals in the rear end portion of the photosensitive section are accurately rejected in synchronization with the shift pulse. Thus, the total number of picture elements output by the CCD sensor is decreased, and the signal processing time is decreased by a corresponding amount. This results in high speed operation of the CCD sensor.

What is claimed is:

1. A method of driving a CCD sensor having a photosensitive section comprising front, middle, and rear regions each containing a photosensitive picture element array, the picture element array in said rear region being smaller than the picture element array in said front region, said method comprising the steps of:

transferring image data stored in said photosensitive section in a parallel mode from said photosensitive section to a transfer section in synchronization with a shift pulse having a predetermined period; and shifting in a serial mode picture element signals of said front, middle, and rear regions such that picture element signals of said front and middle regions but not of said rear region are read out from said transfer section in synchronization with a transfer pulse having a predetermined period before the following transfer of the image data from said photosensitive section to said transfer section in the parallel mode.

2. The method of driving a CCD sensor as claimed in claim 1, wherein the image data stored in the middle region of said photosensitive section is necessary data to be read out.

3. The method of driving a CCD sensor as claimed in claim 1, wherein the period of the shift pulse is a charge storage time $t_{INT}$ of said photosensitive section.

4. The method of driving a CCD sensor as claimed in claim 3, wherein the charge storage time $t_{INT}$ has relation With regard to the clock frequency $f\phi$ of the transfer pulse, which is defined by $$((N_{DA}+N)/f\phi)\times\mu \leq t_{INT}$$

where $N_{DA}$ is the number of picture elements in the front region, N is the number of picture elements in the middle region and $\mu$ is a coefficient determined according to the structure of said transfer section 5. The method of driving a CCD sensor as claimed in claim 3, wherein the charge storage time $t_{INT}$ is determined so that an appropriate amount of optical signal charges can be accumulated in said photosensitive section.

6. The method of driving a CCD sensor as claimed in claim 4, wherein the charge storage time $t_{INT}$ is determined so that an appropriate amount of optical signal charges can be accumulated in said photosensitive section.

7. The method of driving a CCD sensor as claimed in claim 1 wherein the image data is transferred in the parallel mode so that the data in the front region overlaps with data in the rear region which has been transferred in a preceding transferring step.

8. The method of driving a CCD sensor as claimed in claim 1, wherein the picture element array of said middle region contains image data which is necessary to be output from said transfer section and the picture element arrays of said front and rear regions contain image data which is not necessary to be output from said transfer section.

9. A method of driving a CCD sensor having a photosensitive section containing a photosensitive image data array, said method comprising the steps of:
transferring first image data stored in said photosensitive section in a parallel mode from said photosensitive section to a transfer section;
shifting in a serial mode a portion of said transferred first image data from said transfer section; and
transferring second image data stored in said photosensitive section prior to shifting all of said transferred first image data out of said transfer section such that a portion of said transferred first image data overlaps with a portion of said transferred second image data.

10. The method of driving a CCD sensor as claimed in claim 9, wherein the portions of said transferred first image data and transferred second image data which are not overlapped include image data which is necessary to be output from said transfer section.

11. The method of driving a CCD sensor as claimed in claim 9, wherein said overlapped portions of transferred image data do not include image data which is necessary to be output from said transfer section.

12. The method of driving a CCD sensor as claimed in claim 9, further comprising the step of shifting in a serial mode said overlapped image data and a portion of said transferred second image data which is not overlapped from said transfer section.

13. The method of driving a CCD sensor as claimed in claim 12, wherein said portion of said transferred second image data which is not overlapped but is shifted from said transfer section includes image data which is necessary to be output from said transfer section.

* * * * *